(12) United States Patent
Wang et al.

(10) Patent No.: US 10,572,892 B2
(45) Date of Patent: Feb. 25, 2020

(54) PRICE COMPARISON SYSTEMS AND METHODS

(71) Applicant: Wal-Mart Stores, Inc., Bentonville, AR (US)

(72) Inventors: Joseph Y. Wang, San Bruno, CA (US); Venkata Syam Prakash Rapaka, Mountain View, CA (US); Vivek Parekh, Fremont, CA (US); Paul Kay Hatch, Bentonville, AR (US); Ronald G. Benson, San Francisco, CA (US); Nella Shapiro, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 14/292,701

(22) Filed: May 30, 2014

(65) Prior Publication Data

US 2014/0278903 A1    Sep. 18, 2014

Related U.S. Application Data

(63) Continuation-in-part of application No. 13/754,620, filed on Jan. 30, 2013.

(51) Int. Cl.
*G06Q 30/02* (2012.01)
(52) U.S. Cl.
CPC ................. *G06Q 30/0234* (2013.01)
(58) Field of Classification Search
CPC .................................................. G06Q 30/0234
(Continued)

(56) References Cited

U.S. PATENT DOCUMENTS

| 5,226,519 A | 7/1993 | Dewoolfson |
| 5,642,279 A | 6/1997 | Bloomberg et al. |

(Continued)

FOREIGN PATENT DOCUMENTS

| WO | 1996001454 | 1/1996 |
| WO | 1997046985 | 12/1997 |

(Continued)

OTHER PUBLICATIONS

Microsoft Computer Dictionary, Fifth Edition, 2002, Microsoft Press, p. 23.*

(Continued)

*Primary Examiner* — Jay Huang
*Assistant Examiner* — Michael I Ezewoko
(74) *Attorney, Agent, or Firm* — Bryan Cave Leighton Paisner LLP

(57) ABSTRACT

Systems and methods are disclosed for evaluating a transaction concluded at a POS (point of sale) device. Prices for competitive retail stores within a geographic region of the POS may be evaluated after concluding a transaction. Price differences between items and corresponding prices in the third party data are identified. Where the purchase price exceeds the corresponding third-party price, a credit is assigned to the customer, such as in the form of a gift card or code that may be redeemed in a subsequent transaction. Credits may also be assigned to a debit card associated with a user, either with or without applying some multiplier. A credit may be applied to an online transaction of the user. Based on the use of the credit, the user's in-store purchases and online purchases may be related to the same individual and used to better characterize interests of the user.

20 Claims, 7 Drawing Sheets

(58) Field of Classification Search
USPC .................................................. 705/14.34
See application file for complete search history.

(56) References Cited

U.S. PATENT DOCUMENTS

| | | | |
|---|---|---|---|
| 5,873,069 A | 2/1999 | Reuhl | |
| 5,883,968 A | 3/1999 | Welch | |
| 6,016,480 A | 1/2000 | Houvener | |
| 6,076,070 A | 6/2000 | Stack | |
| 6,732,081 B2 | 5/2004 | Nicholson | |
| 6,811,030 B1 | 11/2004 | Compton | |
| 6,912,507 B1 | 6/2005 | Phillips et al. | |
| 7,069,240 B2 | 6/2006 | Spero et al. | |
| 7,082,415 B1 | 7/2006 | Robinson et al. | |
| 7,099,833 B1 | 8/2006 | Sundaresan | |
| 7,107,225 B1 | 9/2006 | McClung, III | |
| 7,198,192 B2 | 4/2007 | Page et al. | |
| 7,200,576 B2 | 4/2007 | Steeves et al. | |
| 7,455,226 B1 | 11/2008 | Hammond | |
| 7,580,860 B2 | 8/2009 | Junger | |
| 7,580,873 B1 | 8/2009 | Silver et al. | |
| 7,606,731 B2 | 10/2009 | McClung, III | |
| 7,657,470 B1* | 2/2010 | Delurgio et al. | 705/35 |
| 7,660,738 B1 | 2/2010 | Siegel | |
| 7,740,172 B1 | 6/2010 | Hubert | |
| 7,746,510 B2 | 6/2010 | Pandipati | |
| 7,783,515 B1 | 8/2010 | Kumar et al. | |
| 7,792,709 B1 | 9/2010 | Trandal et al. | |
| 7,865,427 B2 | 1/2011 | Wright et al. | |
| 7,881,991 B2 | 2/2011 | Darrell | |
| 8,006,900 B2 | 8/2011 | Grigsby | |
| 8,027,439 B2 | 9/2011 | Zoldi et al. | |
| 8,046,260 B2 | 10/2011 | Haddad et al. | |
| 8,108,287 B2 | 1/2012 | Kirch et al. | |
| 8,160,984 B2 | 4/2012 | Hunt | |
| 8,175,918 B2 | 5/2012 | Cooper et al. | |
| 8,180,682 B2 | 5/2012 | Narayanaswami et al. | |
| 8,249,916 B2 | 8/2012 | Gworek | |
| 8,346,634 B2 | 1/2013 | Shiftan | |
| 8,356,750 B2 | 1/2013 | Hammond | |
| 8,448,859 B2 | 5/2013 | Goncalves | |
| 8,458,010 B1* | 6/2013 | Geoffrin et al. | 705/7.35 |
| 8,494,909 B2 | 7/2013 | Goncalves | |
| 8,511,574 B1 | 8/2013 | Yen et al. | |
| 8,615,422 B1 | 12/2013 | Alkasimi | |
| 8,793,760 B2 | 7/2014 | Raper | |
| 10,032,185 B2* | 7/2018 | Watfa | G06Q 30/0234 |
| 2002/0052756 A1 | 5/2002 | Lomangino | |
| 2002/0069118 A1 | 6/2002 | Zylstra | |
| 2002/0198772 A1 | 12/2002 | Bates et al. | |
| 2004/0088230 A1 | 5/2004 | Elliott | |
| 2005/0160014 A1* | 7/2005 | Moss | G06Q 30/00 705/26.61 |
| 2005/0240525 A1 | 10/2005 | Bagayatkar | |
| 2005/0240535 A1 | 10/2005 | Grooms | |
| 2005/0246225 A1 | 11/2005 | Jorgensen | |
| 2006/0015403 A1 | 1/2006 | McClung, III | |
| 2006/0261160 A1 | 11/2006 | Garner | |
| 2007/0021973 A1 | 1/2007 | Stremier | |
| 2007/0073592 A1* | 3/2007 | Perry | G06Q 30/0601 705/26.1 |
| 2007/0094087 A1 | 4/2007 | Mitchell | |
| 2007/0174073 A1 | 7/2007 | Hunscher | |
| 2007/0265914 A1 | 11/2007 | McClung | |
| 2008/0005017 A1 | 1/2008 | Poster | |
| 2008/0073429 A1 | 3/2008 | Oesterling | |
| 2008/0086411 A1 | 4/2008 | Olson | |
| 2008/0140576 A1 | 6/2008 | Lewis et al. | |
| 2008/0149725 A1 | 6/2008 | Rosenbaum | |
| 2008/0201226 A1* | 8/2008 | Carlson | G06Q 20/387 705/14.26 |
| 2008/0255951 A1 | 10/2008 | Miller et al. | |
| 2009/0018965 A1 | 1/2009 | Neydavood | |
| 2009/0048934 A1 | 2/2009 | Haddad | |
| 2009/0138358 A1 | 5/2009 | Gonen | |
| 2009/0271265 A1 | 10/2009 | Lay | |
| 2009/0299887 A1 | 12/2009 | Shiran et al. | |
| 2009/0327062 A1* | 12/2009 | Botes | 705/14.17 |
| 2010/0042488 A1 | 2/2010 | McClung, III | |
| 2010/0306080 A1 | 12/2010 | Trandal et al. | |
| 2011/0066483 A1* | 3/2011 | Salmon et al. | 705/14.17 |
| 2011/0225098 A1 | 9/2011 | Wolff | |
| 2011/0307318 A1* | 12/2011 | LaPorte | G06Q 20/209 705/14.33 |
| 2012/0018501 A1 | 1/2012 | Wilen | |
| 2012/0078682 A1 | 3/2012 | Pinsley et al. | |
| 2012/0078739 A1 | 3/2012 | Maraz | |
| 2012/0095853 A1 | 4/2012 | von Bose et al. | |
| 2012/0143722 A1 | 6/2012 | John | |
| 2012/0221430 A1 | 8/2012 | Naghmouchi | |
| 2012/0271759 A1 | 10/2012 | Lee | |
| 2012/0323663 A1 | 12/2012 | Leach | |
| 2013/0030898 A1 | 1/2013 | Burton | |
| 2013/0054433 A1 | 2/2013 | Giard et al. | |
| 2013/0066698 A1 | 3/2013 | Levy et al. | |
| 2013/0246143 A1 | 9/2013 | Hunt | |
| 2013/0317896 A1 | 11/2013 | Liberty | |
| 2014/0032061 A1 | 1/2014 | Wulf et al. | |
| 2014/0058938 A1 | 2/2014 | McClung, III | |
| 2014/0074665 A1 | 3/2014 | Stewart | |
| 2014/0095350 A1 | 4/2014 | Carr et al. | |
| 2014/0097237 A1 | 4/2014 | Delfer | |
| 2014/0108272 A1 | 4/2014 | Mayo | |
| 2014/0122325 A1 | 5/2014 | Zoldi et al. | |
| 2014/0172697 A1 | 6/2014 | Ward et al. | |
| 2014/0201037 A1 | 7/2014 | Mallawarachchi et al. | |
| 2016/0148300 A1 | 5/2016 | Carr et al. | |
| 2017/0193542 A1 | 7/2017 | Rapaka et al. | |

FOREIGN PATENT DOCUMENTS

| | | |
|---|---|---|
| WO | 1999064979 | 12/1999 |
| WO | 2012131401 | 10/2012 |
| WO | WO2013159152 A1 | 10/2013 |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Final Office Action (U.S. Appl. No. 14/292,681); Notification Date: Feb. 12, 2016.
Final Office Action (U.S. Appl. No. 14/292,633); Notification Date: Feb. 12, 2016.
Final Office Action (U.S. Appl. No. 14/292,629); Notification Date: May 2, 2016.
Non-Final Office Action (U.S. Appl. No. 14/292,633); Notification Date: Nov. 3, 2016.
Non-Final Office Action (U.S. Appl. No. 14/292,681); Notification Date: Nov. 17, 2016.
Non-Final Office Action (U.S. Appl. No. 14/292,629); Notification Date: Nov. 17, 2016.
Non-Final Office Action (U.S. Appl. No. 14/292,451); Notification Date: Dec. 1, 2016.
Data Warehousing, Academic Press, 2001, chapter(s) 7-9 2001.
Algorithms + Data Structures = Programs, 1976, pp. xii-55 1976.
HCI remixed: reflections on works that have influenced the HCI community, MIT Press, 2008, pp. 275-279 2008.
Why a Diagram is (Sometimes) Worth Ten Thousand Words, Larkin, Simon, Congnitive Science, 1987, pp. 65-100 1987.

(56) References Cited

OTHER PUBLICATIONS

Streetlights and Shadows, MIT Press, 2009, pp. 33-47 2009.
The future of the internet—and how to stop it, Yale University Press, 2008, Chapter(s) 1-9, [emphasis pp. 11-18] 2008.
Database Management System, Himalaya Publishing House, 2008, chapter(s) 2-3; prior art used in this Office Action 2008.
Advanced Artificial Intelligence, Shi, World Scientific, 2011, pp. 430-458 2011.
Data Mining, Elsevier, Han and Kamber, 2006, pp. 234-274 2006.

* cited by examiner

PRICE COMPARISON SYSTEMS AND METHODS

RELATED APPLICATIONS

This application is a continuation-in-part of U.S. application Ser. No. 13/754,620, filed Jan. 30, 2013. That application is incorporated herein by reference for all purposes.

BACKGROUND

Field of the Invention

This invention relates to systems and methods for providing competitive pricing to consumers.

BACKGROUND OF THE INVENTION

For a retailer such as Wal-Mart it is very important that customers receive the lowest possible price on items for sale and that customers are aware that the prices at Wal-Mart provide the best deal. For customers, it is likewise important to find the best possible deal on purchases. For both the retailer and the customer it can be difficult to evaluate pricing. Competitors may transmit advertisements on various media and publish advertisements and coupons in various publications. A customer must therefore wade through all of these for all items in order to find the best deal. Once found, price matching may enable a customer to buy all items at the same store rather than visit various retail stores. However, the time spent in reviewing advertisements each week is nonetheless inconvenient.

The systems and methods disclosed herein provide an improved approach for a retailer to ensure that prices paid by a customer are competitive and to ensure that the customer is aware of savings obtained by shopping at a retailer.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
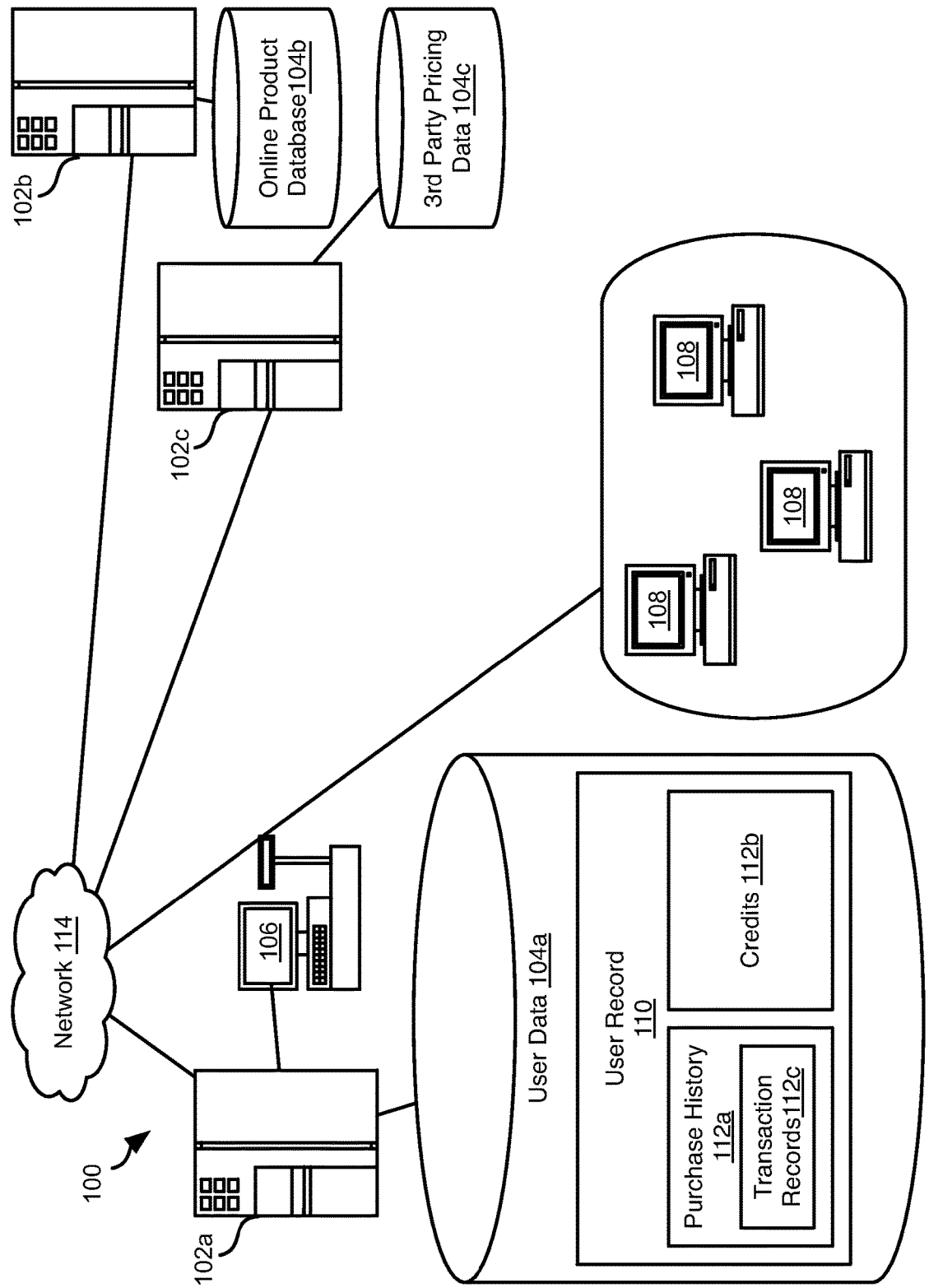
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In some embodiments, a customer may conduct a transaction at a POS (point of sale) device. The transaction may include the purchase of one or more items each having a purchase price paid by the customer. The transaction may be recorded in a transaction record, e.g. receipt, wherein each purchased item is represented by an item identifier. In some instances, the item identifier may be sufficient to also determine the price paid such that the transaction record need not be included in the transaction record. For example, a product database may record the price for a given item identifier at a given date and/or time. In other embodiments, the transaction record may also include the price. The transaction record may be a paper receipt printed for the customer and may also be an electronic record generated for a transaction by the POS and transmitted to a server.

A method may be executed with respect to the transaction. For example, subsequent to the first transaction, a server system may identify for each item identifier of at least a portion of the one or more item identifiers of a transaction, a third party record, the third party record corresponding to the each item identifier and having a third party price. For example, the third party record may include a competitor's advertisement or a transcription of pricing information from an advertisement by an entity that gathers pricing data.

The server system may identify one or more discounted identifiers of the one or more item identifiers, the third party price of the third party record corresponding to the discounted identifiers being less than the price paid for the one or more discounted identifiers by one or more price differences. The server system may then credit an account associated with the user identifier with an amount corresponding to the one or more price difference. The server system may then subsequently apply the amount toward a purchase price of a second transact subsequent to the first transaction.

Transactions processed according to the methods herein may be online transactions as well as in-store transactions. In some embodiments, a credit for an in-store transaction may be applied to an online transaction thereby linking the in-store and online transactions to the same user. The aggregate online and in-store transactions may then be used to better characterize the interests of the user. In a like manner, a credit or an online transaction may be applied to an in-store transaction thereby establishing an association between the transactions.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102a associated with a corporate parent or controlling entity having one or more retail establishments associated therewith. The retail establishments may house point of sale devices (POS) 106 on which transactions may be concluded. Records of transactions may be transmitted to the server system 102a by the POS 106a at the various retail establishments.

In some embodiments, data regarding third parties and used according to the methods disclosed herein may be gathered from various sources. For example, a server 102b of one entity may provide a website providing access to an online product database 104b, which may include access to product records including product prices and corresponding product identifiers and other descriptive information. A database 104b may also include a publicly accessible website or the like listing advertisements for products offered for sale in a retail establishment.

In some embodiments, data regarding third parties may be obtained from a server system 102c operated by a data gathering entity. For example, the server system 102c may store third party pricing data 104c. The pricing data may include data gathered from advertisements published by retail entities. Pricing data could include entries including fields such as an entity identifier, location, price, product identifier (e.g. UPC), a date the product was offered at the price, or the like. The pricing data may be gathered and be provided within N day of Hours from when it was published. For example, pricing data may be provided the next day, 48 hours, or 72 hours, after initially publicized.

The server system 102a may access and use user data 104a, which may include a plurality of user records 110. A user record 110 may be associated with a particular user who may be identified by a unique customer identifier. The user may have access to some or all of the data in the user record and a user name and password may be associated with the user record and with which a user may log in the server system 102a in order to obtain access to the user record 110.

The user record 110 may include such data as a purchase history 112a including a record of previous transactions conducted by the user associated with the user record 110 at the various POSs 106 associated with the server system 102a. The user record may further include a record of credits 112b assigned to the user associated with the user record as well as a redemption or usage of such credits. The methods by which the credits 112b are assigned and used are described in greater detail below.

In some embodiments, methods as described herein may evaluate or modify the purchase history 112a, credits 112b, and one or more other type of information about a user associated with the user record 110. In particular, the purchase history 112a may include, or be embodied as, transactions records 112c each recording specific aspects of a transaction, as discussed hereinbelow.

Customers may access the server system 102a in order to participate in the methods described herein by means of user computing devices 108 that may be embodied as desktop or laptop computers, tablet computers, smart phones, or the like. Communication among servers 102a-102c, POS 106, and workstations 108 may occur over a network 114 such as the Internet, local area network (LAN), wide area network (WAN) or any other network topology. Communication may be over any wired or wireless connection.

Figure 2:
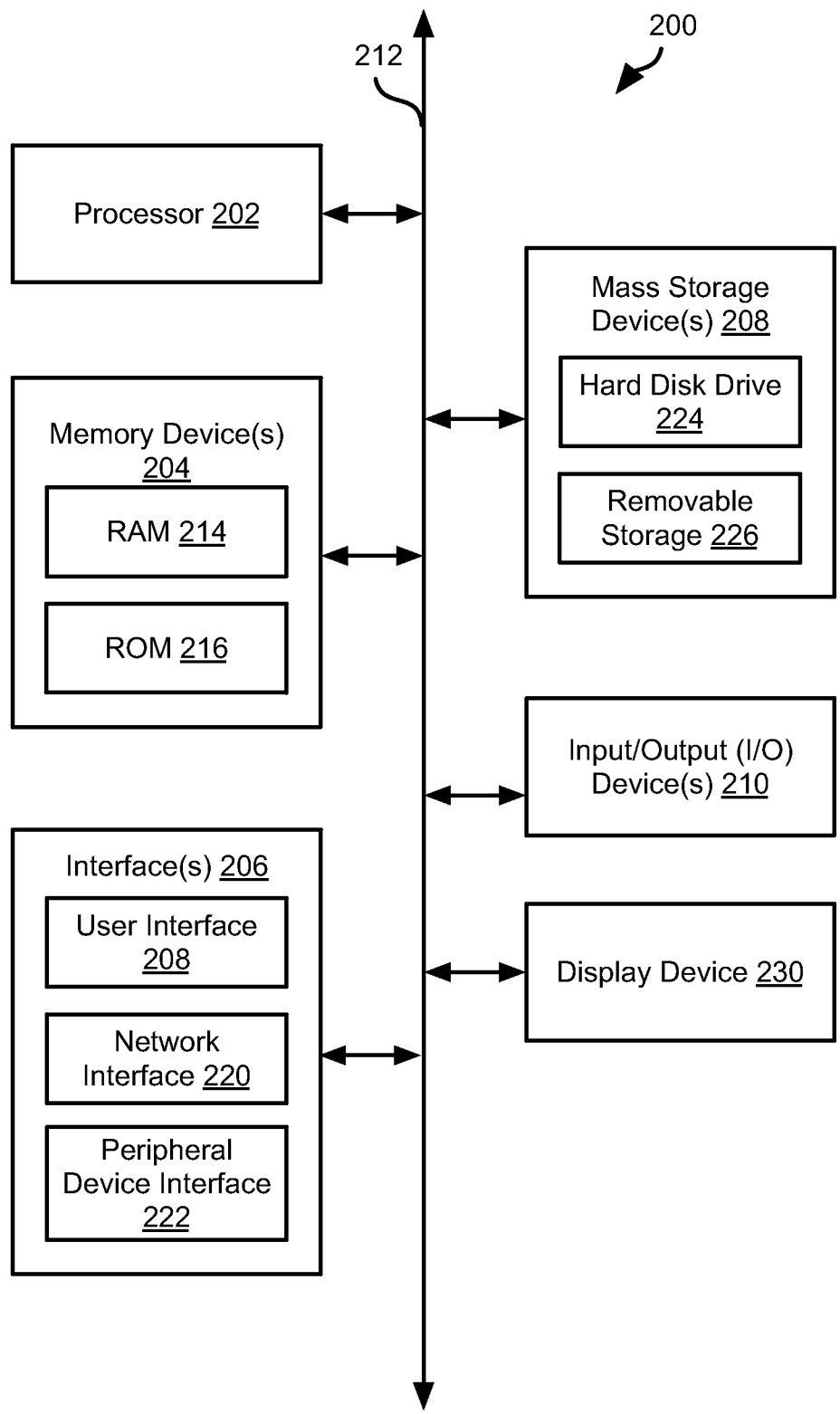
FIG. 2 is schematic block diagram of a computer system suitable for implementing methods in accordance with embodiments of the invention.

FIG. 2 is a block diagram illustrating an example computing device 200. Computing device 200 may be used to perform various procedures, such as those discussed herein. A server system 102a-102c, POS 106, and user computing device 108 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102a-102c may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
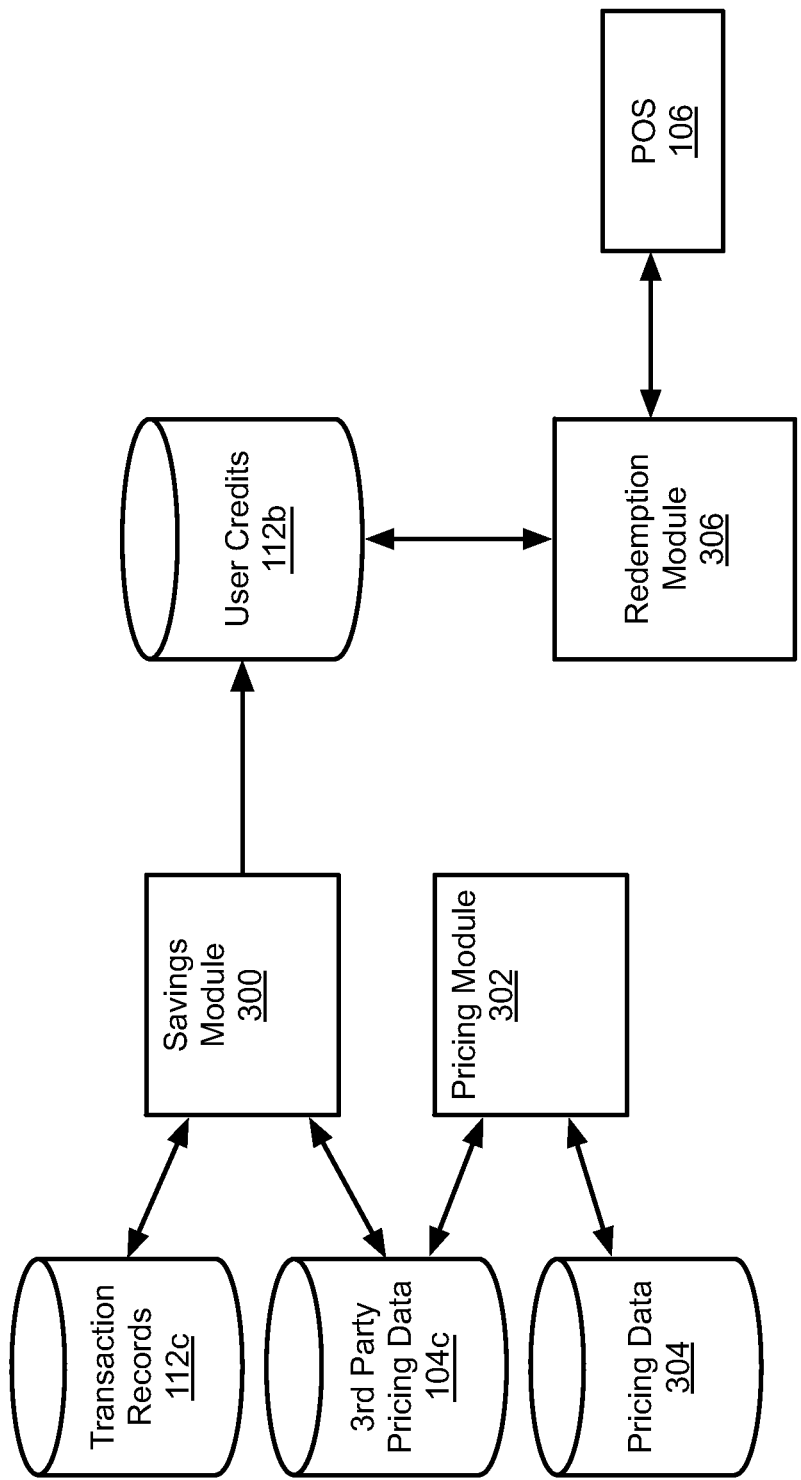
FIG. 3 is a schematic block diagram of components implementing methods in accordance with an embodiment of the present invention.

Referring to FIG. 3, a savings module 300 may ingest data such as a transaction record (e.g. receipt) from among user transaction records 112c. The savings module 300 may further take as input third party pricing data 104c. The third party pricing data 104c may be pricing data from different entities than the entity that conducted the transaction represented by the transaction record. The third party pricing data 104c may be data that reflect prices offered on a same day as a date on which the transaction represented by the transaction record took place. The savings module 300 compares the prices of items in the transaction record to prices for corresponding items in the third party pricing data 104c. The savings module then assigns user credits 112b to an account of the user associated with the transaction or otherwise attributes credits 112b to the user.

A pricing module 302 may access third party pricing data 104c in order to determine prices for items to be stored in pricing data 304 of an entity performing the methods disclosed herein. The pricing module 302 may use third party pricing data as well as observations of customer behavior in order to determine an appropriate price for an item. Methods for determining pricing for items will be described in greater detail below.

A redemption module 306 may interact with one or more POSs 106 to apply the credits to subsequent transactions. For example, the redemption module 306 may issue a gift card, code for a gift card, assign credits to a gift card, or otherwise provide a message containing information that a user may use at a POS 106 in order to apply the credits to a transaction. The redemption module 306 may interact with the POS 102 in order to validate a gift card, code, or other representation of credits presented at the POS 106 when processing payment for a transaction. For example, a cashier or device may receive the code, scan the gift card, swipe the gift card through a magnetic reader, or otherwise input a representation of the gift card into the POS 106. The POS 106 may then transmit this information, or a representation thereof, to the redemption module 306. If the transmitted information is valid, the redemption module 302 may transmit authorization to the POS 106 to apply corresponding credits to the transaction. Otherwise, the redemption module 306 may transmit a rejection of the transmitted information and the POS 106 will not apply any corresponding credits to the transaction. The redemption module 306 may interact with in-store POS 106 as well as POS 106 that process online transactions.

Figure 4:
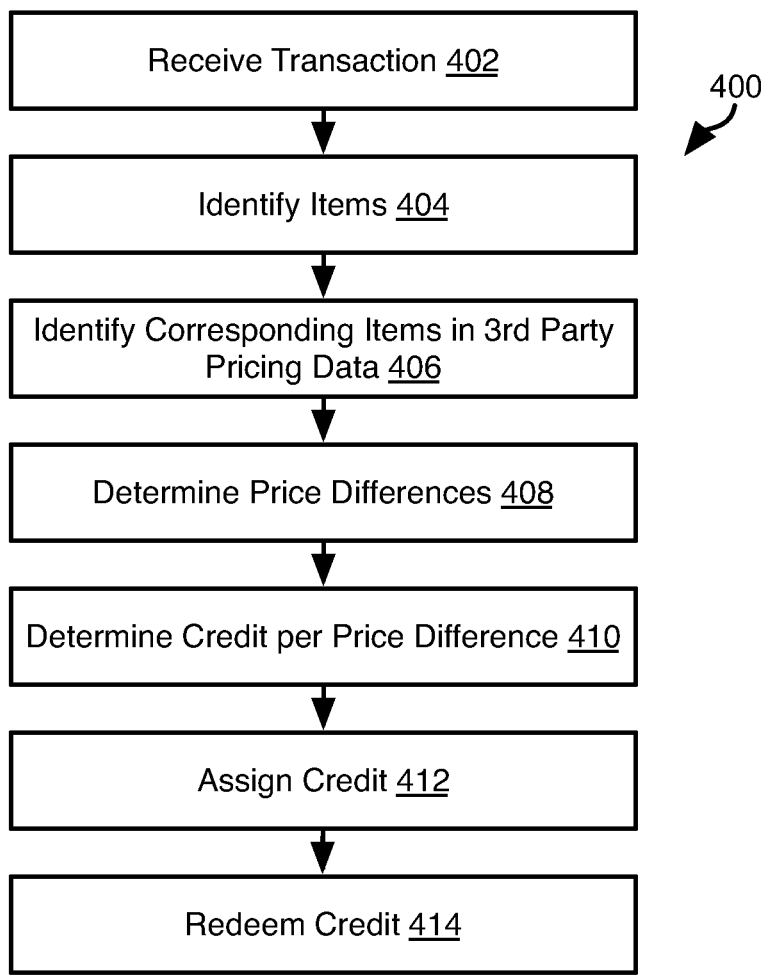
FIG. 4 is a process flow diagrams of a method for providing a credit based on price differences in accordance with an embodiment of the present invention.

FIG. 4A illustrates an example of a method 400 that may be used to provide credits to users based on price difference between a price paid and third party prices. The method 400 may include receiving 402 a record of a transaction. A record of a transaction may include such data as a date of the transaction, a location where the transaction occurred, an identifier of the POS at which the transaction occurred, an identifier of the customer that was a party to the transaction, and other information. The transaction record may further include various <product,price> entries that list a product identifier and a price paid for the product corresponding to that product identifier. Other data may include taxes paid for the entire transaction and/or for specific item identifiers. Any discounts due to coupons or price matching may also be noted for each item identifier for which such price adjustments were applied. The transaction record may be transmitted from a POS 106 to a server system 102a. The transaction record may additionally or alternatively transmitted to a customer in electronic form and/or by means of a printed copy. The transaction record may be associated by the server system with the user data 110 of a user with whom the transaction was conducted, such as using a credit card number or identifier supplied to the POS at the time of concluding the transaction and included in, or associated with, the transaction record. For example, the transaction record may be in the form of an electronic receipt provided to the customer.

The step of receiving 402 the receipt may include receiving a transaction identifier from a user computing device 108 through a portal such as a website hosted by the server system 102. The transaction identifier may uniquely identify the transaction record and may be printed on a paper receipt to enable the customer to take advantage of the methods disclosed herein and/or for other purposes. Receiving 402 the receipt may include receiving, by the server system 102a, a selection of the transaction in a listing of transactions presented in a portal provided by the server system 102a or by an application for viewing receipts stored locally on a user computing device 108. For example, transactions may be made available to a user in the form of electronic receipts stored in an account of a user and recording transactions conducted by the user. In some embodiments, all transactions of a user may be submitted for review according to the method 400. For example, where a user has installed a mobile application for interfacing with the server system 102a, all transactions of a user may be automatically submitted for review according to the method 400. In some embodiments, transactions may be transmitted to the server system by 1) the user scanning a bar code or other optical code printed on a receipt with a user device 108, 2) the user device 108 transmitting some representation of the optical code to the server system 102a and 3) the server system 102a identifying a transaction record corresponding to the transmitted representation of the optical code.

In some embodiments, the server system 102a may limit a number of receipts that may be submitted by a customer, e.g. for a specific user account. For example, N transactions may be process per week for the customer. In some embodiments, multiple limits on receipts for multiple corresponding time period may be imposed. For example, only N transactions per week or M transactions per month may be allowed by the server system 102a to be processed according to the methods described herein for purposes of determining a credit based on price differences.

In some embodiments, transactions received may be online transactions concluded by the server system 102a. In such embodiments, all transactions conducted by a user may be processed according to the method 400. The number of online transactions that may be processed according to the method 400 within a given period may be limited as described above.

The method 400 may further include identifying 404 from the received transaction record the item identifiers of items purchased as part of the transaction and the price for each item. For example, fields of the form <item identifier, price paid> may be filled with the item identifier and purchase price for some or all items listed as having been purchased in a transaction record. The item identifier may be a proprietary product identifier for a product catalog of a merchant or a universal identifier (e.g. a universal product code (UPC)).

For some or all of the identified 404 items, corresponding items may be identified in third party pricing data. In particular, a lowest price for each item identifier may be identified 406 among the third party pricing data. As noted above, pricing data may include advertised prices exclusively. Pricing data may also include the sale price for some items regardless of whether that price is advertised. Pricing data searched to identify corresponding third party prices may be limited to pricing data for retail stores within a threshold proximity of the POS or retail location identified by the transaction record that is the subject of the method 400. For example, the threshold may reference a geographical or political region (neighborhood, city, county, state, etc.) or may specify a circular area having a radius R with respect to the POS or store location indicated in the transaction record.

Identifying the lowest price among the third party pricing data for each item identifier of at least a portion of the item identifiers in a transaction may include determining a per-unit cost for corresponding items in the third party pricing data. For example, if a product corresponding to an item identifier is offered for sale as a buy N at price P per unit and get M free, then the price of an individual instance of that product may be prorated to be $(N/(N+M))*P$. This prorated price may then be used for purposes of determining whether a price is the lowest as compared to prices offered for that product by other entities and for comparison with the purchase price for the corresponding item identifier in the transaction record. In some instances, where items are sold by a unit of measure, such as weight, the cost per unit weight for an item may also be determined form the third party pricing data. For example, this approach may be applied to produce, meat, or the products sold by weight, volume, or some other unit of measurement. In some instances, products may be offered for sale at a certain price at limit of N per customer. Accordingly, where a third party promotion imposes such a limit, this limit may likewise be imposed when assigning credits. For example, where a third party price is offered only for N items and a customer buys M items, M being greater than N, the customer may be assigned a credit based on the difference between the purchase price paid for N of the M items and the third party price. For the remaining M-N items a credit may still be assigned if some other promotion or third party price is found to be lower than the purchase price paid.

Where a transaction received at step 402 is an online transaction, the third party pricing data may include prices corresponding to item identifiers as listed on an online interface (e.g. website) that is publically accessible. The third party prices evaluated may not be limited with respect to geography as for in-store transactions. However, third party prices may only be considered for online stores operating within the same country as that in which a transaction occurred that is being processed according to the method 400. The third party prices may be obtained by automated crawling of the third party web sites (e.g. using web crawlers or web bots). The third party prices may be obtained from an entity that gathers and publishes such information such as a SHOPZILLA.COM, the GOOGLE shopping API (application programming interface), or some other service. In some embodiments, not all third party online prices may be used according to the methods described herein. For example, AMAZON sells products to consumers through its website and also allows others to market products on the site through the AMAZON MARKETPLACE. In some embodiments, third party prices for products offered by outside entities on a third party's website may be excluded from comparison according to the methods described herein.

Inasmuch as third party online prices are more readily retrieved, the third party online pricing data may updated more frequently than in-store pricing data. For example, third party online pricing data may be retrieved once a day, once an hour or M hours (M<24), or some other period.

The method 400 may further include, for each item identifier of some or all of the item identifiers of the transaction record determining 408 a price difference between the lowest price found for the each item identifier in the third party pricing data. A credit for the transaction record according to the price differences determined at step 408 may then be determined 410. For example, a credit equal to $P_t-P_3$ may be assigned for each item identifier for which $P_t-P_3$ is a positive number, where to $P_t$ is the price paid as indicated by the transaction record and $P_3$ is the lowest corresponding third party price identified at step 406 for the item identifier.

The sum of the credits for each item identifier as determined may then be assigned to the user associated with the transaction record, such as by assigning a credit equal to the sum of the credits to an account associated with a same user identifier as included in the transaction record. For example, in some embodiments, the method 400 may include assigning 418 a credit, such as by generating a gift card, gift code, coupon, or some other data used to uniquely identify an account to which the credit was assigned or to represent the value of the credit. In some embodiments, the credit may be assigned to a debit card account. For example, a debit card having a checking account associated therewith or used exclusively by means of a debit card. For example, an AM-EX BLUEBIRD account provided by cooperation between WAL-MART and AMERICAN EXPRESS. The credit may also be multiplied by some multiplier greater than one, such as two, and the result of the multiplication assigned to the account of a user. In some embodiments, a user may be presented a choice between 1) a gift card or code or other assignment of credit to the user and 2) assignment of a credit to a debit card after applying some multiple. In some embodiments, a credit may be assigned in the form of a simple credit, gift card, or gift code by default.

The method 400 may further include redeeming 420 the credit. The credit may be redeemed in any manner known in the art. For example, a code may be transmitted to the user. The code may then be presented at the POS 106. The code may be input to the POS 106 that either independently validates the code or transmits it to the server system 102*a*. Upon determining that the code is valid, such as by receiving a response from the server system indicating that it is valid, the POS 106 may apply the corresponding credit to a transaction. The code may include text (letters, numbers, other typographic symbols), an optical code (bar code, quick response (QR) code, or the like). In some embodiments, the server system 102*a* may invoke mailing of a gift card to the customer or crediting of an account of the customer that has a card with a magnetic strip encoding an account identifier (e.g. debit card).

In some of the methods contemplated in the present application, credits assigned according to the method 400 for an online transaction may be redeemed to pay for an in-store transaction. Likewise, credits assigned for an in-store transaction may be redeemed to pay for an online transaction. Accordingly, as noted above, both an in-store POS and an online transaction processing POS may access the same redemption module 306 or operate with respect to the same set of data indicating the state of funds associated with a particular gift card, gift code, user account, or other account.

Figure 5:
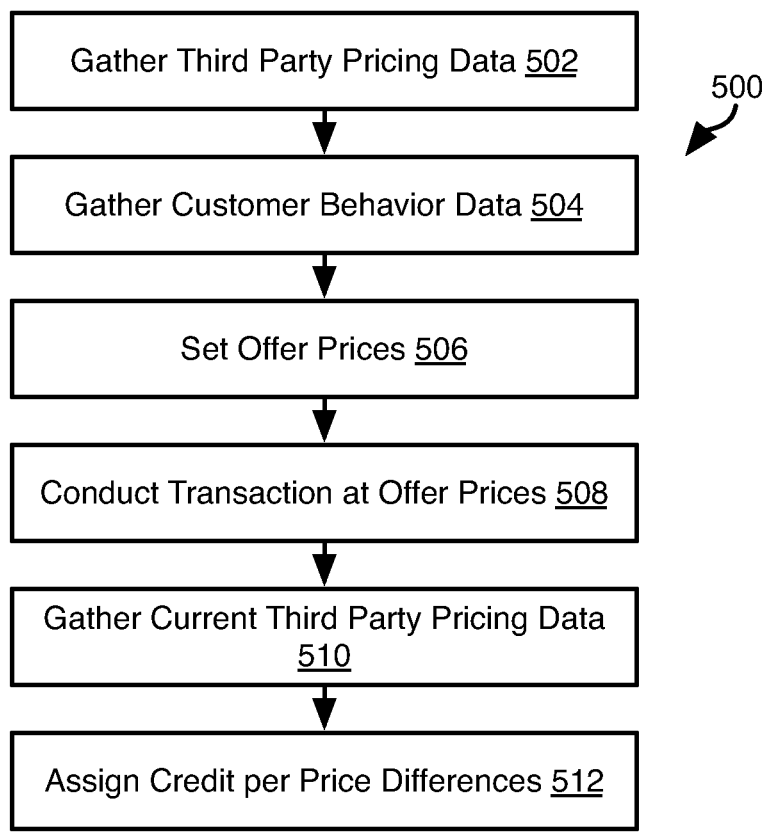
FIG. 5 is a process flow diagram for performing price matching in accordance with an embodiment of the present invention.

Referring to FIG. 5, a method 500 may be used to both set an offer price for an item and provide credits for price differences according to the methods described herein. The method 500 is particularly useful with respect to pricing data for products offered online. The method 500 may include gathering 502 third party pricing data. Gathering third party pricing data may be performed in the same manner as for the method 400, e.g. with a web crawler or from a data gathering entity. The pricing data may be gathered 502 for a window preceding a transaction, e.g. be data valid prior to a transaction being concluded.

The method 500 may further include gathering 504 customer behavior data with respect to the item and setting 506 an offer price based on the gathered 502 third party pricing data and the gathered 504 customer behavior data. For example, a method 600 of setting 506 an offer price is disclosed below.

The method 500 may further include conducting 508 an online transaction in which the item is sold at the offer price, though other discounts, promo codes, or other modifications to the offer price may be applied at the time of checkout as known in the art.

The method 500 may further include gathering 510 current third party pricing data. The third party pricing data gathered at step 510 may be gathered in a second window different from a second window at step 502, though the first and second windows may overlap. In some embodiments, the second window may start where the first window begins, i.e. be performed with respect to pricing data that was not considered when setting the offer price. In other embodiments, the second window may be a time window including the transaction date and extending before and/or after the transaction date. The second window may therefore simply be a window in which third party pricing data is obtained for purposes of assigning credits according to the methods disclosed herein.

The method 500 may further include assigning 512 a credit for the item of the transaction conducted at step 508 according to price differences between price paid for the item and a lowest third party price, such as in a same manner as for the method 400.

Figure 6:
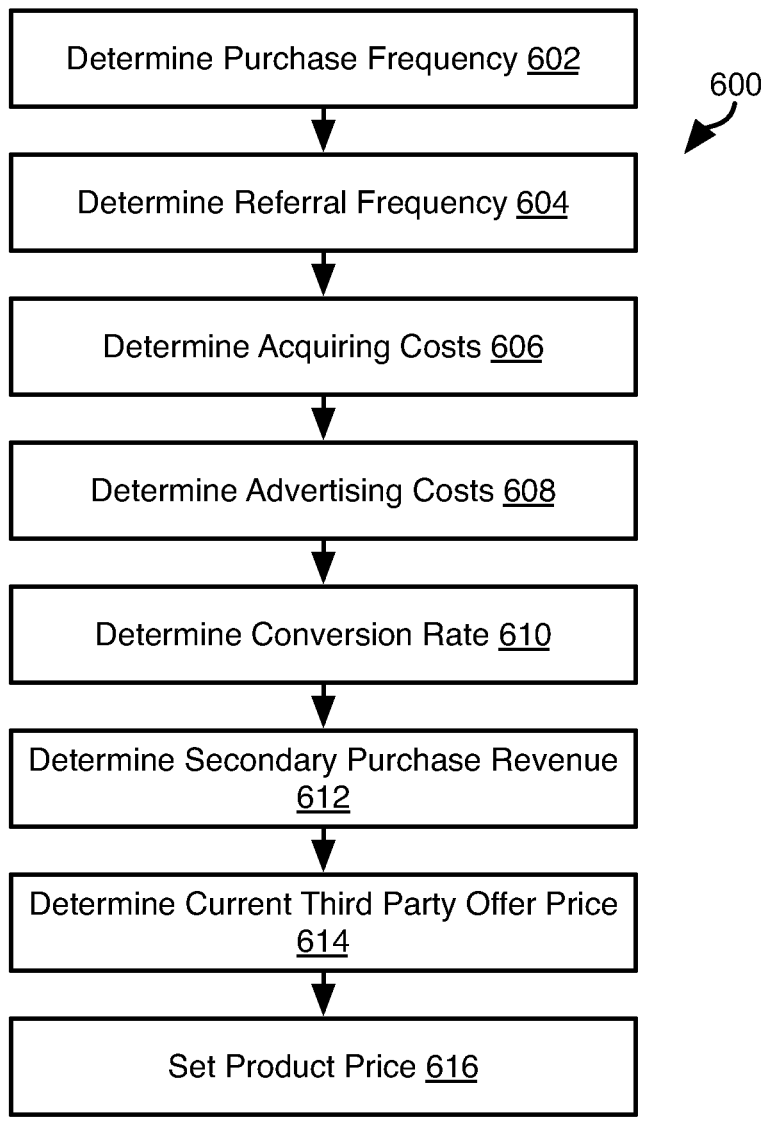
FIG. 6 is a process flow diagram of a method for determining an offering price in accordance with an embodiment of the present invention.

FIG. 6 illustrates a method 600 for setting a price of one or more item identifiers. The method 600 may be performed periodically in order to ensure that pricing for each of the one or more item identifiers is competitive. For example, the method 600 may include determining a purchase frequency for each item identifier of the one or more item identifiers. A purchase frequency may be expressed in terms of purchases per unit time in a window, such as N hours (N being less than 24) preceding performance of the method 600, N days, N weeks, or some other period. In some embodiments, the method 600 may only be executed with respect to those items that are popular, i.e. have a purchase frequency above some threshold or are the top N, N being some integer, products with the highest purchase frequency. Accordingly, the remaining steps of the method 600 may be executed with respect to items having a purchase frequency meeting this threshold condition. Those items that do not meet this condition may be priced based on acquisition costs and other factors in any manner known in the art.

The method 600 may include determining 604 a referral frequency for the one or more item identifiers. A referral frequency for an item may include a number requests for content relating to an item ("hits") initiated by selecting a link in search results, either as presented by a third party search engine or searching a website hosted by the retailer performing the method 600. The frequency may be expressed as hits per unit time within a window, which may be any of the windows noted above for the purchase frequency.

The method 600 may include determining 606 acquiring costs for the one or more items. Acquiring cost may be costs to the entity performing the method 600. The acquiring cost may also be general, e.g. published or universal, costs for certain products where these are known. Acquiring cost may be the costs of the entity performing the method 600 to acquire a unit of a product corresponding to the item identifier. For example, where a product is bought at price X for a lot of N instances of the product, an instance of the product being the smallest unit that can be purchased at a time, then the per unit price is X/N. Other acquiring costs, or estimates thereof, such as shipping costs, taxes, financing costs, stocking costs, may also be taken into account in determining the acquiring cost of an individual instances of an item or lot of items. Determining 606 the acquiring cost for an item identifier may include calculating one or more statistical values based on the acquiring cost for the item over time, such as within a window of time. For example, for a given transaction date, the acquiring costs may be determined on different days within some or all a week, two week period, month period, or some other period of time. For example, for each day in a given period, the acquiring cost on that day may be calculated. These values may then be used as a data set to compute a statistical values for the given period. In some instances, acquiring costs do not change day to day such that the acquiring costs may be measured every N days, or on one or more days of a week, within the given period. Statistical values may include such values as a minimum acquiring cost, maximum acquiring cost, average acquiring cost, and/or a variance of the acquiring costs of the data set.

As for other methods described herein, the acquiring costs may be calculated for a given geographic region, e.g. a region including a location at which a transaction being analyzed according to the methods disclosed herein was concluded. For example, acquiring costs for one or more stores within a radius R from the transaction location may be characterized 1602. Alternatively, acquiring costs for the closest store, or closest M stores (M being 2 or more) may be characterized 1602.

The method 600 may further include determining 608 advertising costs for the one or more item identifiers. Advertising costs may be advertising costs associated specifically to a specific item identifier, e.g. targeted advertising referencing the item identifier (e.g. email advertisements), web ads referencing the item identifier, sponsored links in search results referencing the item identifier, or other advertising costs. In some embodiments, general advertising costs may also be prorated to individual item identifiers.

The method 600 may include determining 610 a conversion rate for each of the one or more item identifiers. A conversion rate may be a ratio of purchases within some time window to some other value. For example, the conversion ratio may be the ratio of a number of purchases of an item identifier within a window and a number of hits on a web page for the item identifier within the window. The conversion ratio may be the ratio of a number of purchases of an item identifier within a window and a number of referrals for the item identifier within the window.

The method 600 may include determining 612 secondary purchase revenue for the one or more item identifiers. Secondary purchase for an item identifier may be revenue from other products purchased in transactions for the item identifier, such as transactions within some window prior to the performance of the method 600, e.g. one month, one week, or some other period. Secondary purchase revenue may be expressed as an average secondary revenue per transaction including the item identifier or as an average secondary revenue per unit time for the item identifier.

The method 600 may further include determining 614 current third party prices for the one or more item identifiers. The current third party price for an item identifier may be a lowest or average third party price for the item identifier among the third party data valid in some window preceding performance of the method 600, such as a one week, one month, or some other window preceding performance of the method 600.

The method 600 may further include setting 616 prices for the one or more item identifiers based on the determinations made at steps 602-614. For example, some or all of the determinations made at steps 602-614 may be input to a function that provides as an output an offer price. For example, where revenue from secondary purchases is high, then the offer price may be set at or below the acquiring cost. For example, an offer price for an item identifier may be set equal to the third party price for the item identifier less some percentage, e.g. 10 percent or some other percentage, of the secondary revenue for the item identifier. The amount by which an offer price is reduced below acquiring costs, or some mark up from the acquiring costs, may increase with increase in some or all of the purchase frequency, referral frequency, conversion rate, and secondary purchase revenue. The purchase frequency, referral frequency, conversion rate, and secondary purchase revenue may be normalized, scaled, and/or weighted to obtain processed versions of these values. The processed versions may then be summed to determine a discount to apply to the acquiring cost, acquiring cost plus some mark up, or the third party offer price. In some embodiments, trends in any of the values determined according to steps 602-614 may be used to set a price. For example, a product that has quickly increasing popularity may be discounted in order to drive traffic to an ecommerce cite.

Figure 7:
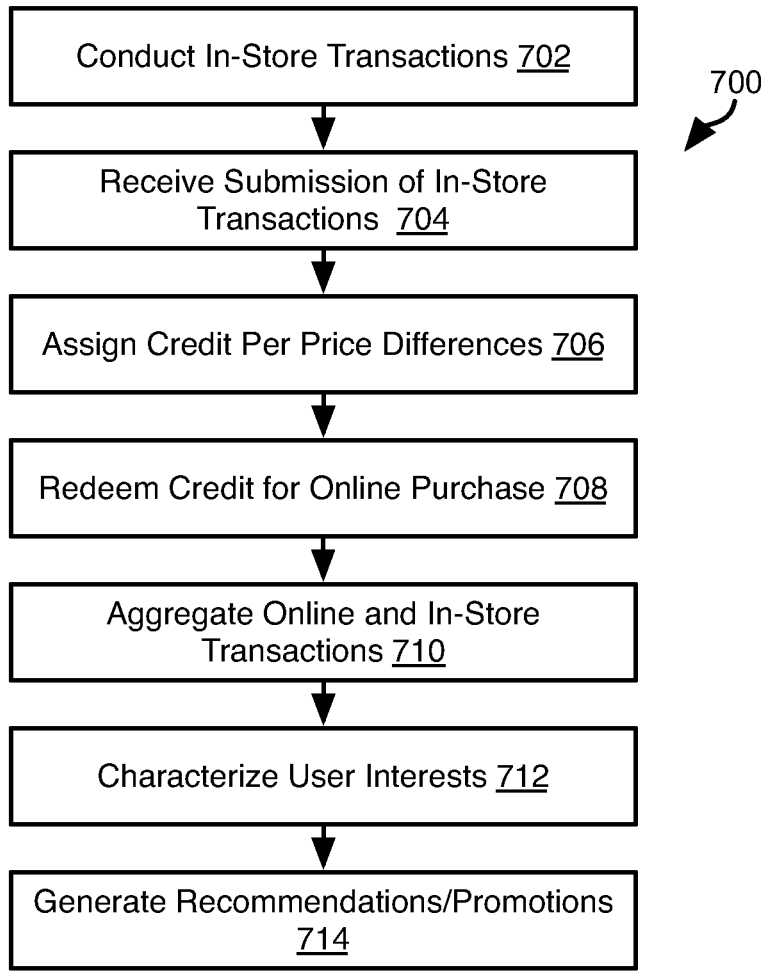
FIG. 7 is a process flow diagram of a method for pricing a product in accordance with an embodiment of the present invention.

Referring to FIG. 7, the illustrated method 700 may be used to relate one or more online purchases to one or more in-store purchases, i.e. determine that online purchases and in-store purchases were made by the same customer without explicit information establishing the association such as by the user using a common user identifier for both types of transactions.

The method 700 may include conducting 702 an in-store transaction or a plurality of in-store purchases. Conducting an in-store purchase may include receiving information that is common to a plurality of in-store purchases for a user, such as a credit card number used for a plurality of purchases, loyalty card number, phone number, user identifier, or some other item of identifying information. Conducting an in-store transaction may further include generating a transaction record describing the transaction. The transaction record may include some or all of the items noted above as possibly included in a transaction record.

The method 700 may further include receiving 704 submission of one or more of the in-store transactions for review and assigning 706 credit according to price differences. Steps 704 and 706 may be performed according to the method 400 of FIG. 4. The credit assigned 706 may be redeemed 708 to completely or partially pay for an online purchase. Redeeming the credit may likewise be performed in a same manner as described hereinabove with respect to the method 400. As part of redeeming 708 the credit, the user may enter a user identifier in order to log in to an account of the customer and conduct the transaction using that account. In some embodiments, the user account and user identifier may not correspond to the identifying information for the in-store transaction at step 702. In some embodiments, the identifying information may be identical but be stored in separate domains or databases such that online transactions of a user are not readily relatable to in-store transactions of the same user.

The method 700 may further include using the fact of the redeeming of the credit to determine that the in-store transaction and the online purchase were conducted by or for the same user. In particular, the credit or code may be associated with an account of the user in which in-store transactions are associated. By entering or using the credit or code for the online transaction, the account with which it is associated may be obtained thereby relating the online and in-store transactions. The online and in-store transactions may then be aggregated 710. In particular, purchases of a user may be used to characterize the interests of the user and used to determine recommendations, promotions, substitutions, and other offers targeted to the user. Accordingly, by aggregating the online and in-store transactions, the amount of data regarding a user is expanded. In particular, the types of items purchased in-store often are not bought online. Accordingly, attempting to characterize a user's consumption behavior based only on online purchases may be inadequate.

The method 700 may further include characterizing 712 a user's interests based on the aggregated transactions and generating 714 recommendations, promotions, and other targeted offers and information to the user based on the aggregated transactions. The methods by which a user's interests may be obtained and promotions generated may be according to any approach known in the art for profiling a customer based on past purchases.

Although method 700 is described above as a process wherein a credit assigned for an in-store transaction may be applied to an online transactions, the opposite may be true. That is, a credit assigned for an online transaction according to the methods described herein may be applied to an in-store transaction thereby establishing an association between the online and in-store transactions. The aggregate online and in-store transactions may then be aggregated and processed according to the method 700.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
using a computerized web crawler to automatically obtain a first set of prices of a plurality of items offered for sale on third party web sites associated with at least a portion of a plurality of third parties, wherein using the computerized web crawler to automatically obtain the first set of prices occurs at a first frequency to update the first set of prices;
obtaining, by a savings system, a second set of prices of the plurality of items based on prices advertised in at least one third party retail store associated with at least one of the plurality of third parties;
storing, by the savings system, the second set of prices in a database;
updating the second set of prices at a second frequency different than the first frequency;
obtaining, by the savings system, a plurality of third party prices of the plurality of items by searching at least one of the first set of prices or the second set of prices;
receiving, by a server system, a first record of one or more items of the plurality of items in a first online transaction with a first entity, the first record comprising one or more item identifiers associated with the one or more items, wherein the first online transaction of one or more online transactions is automatically submitted for review;
subsequent to the first online transaction, identifying, by the server system using the savings system, for each item identifier of at least a portion of the one or more item identifiers, a third party record, the third party record corresponding to the each item identifier and having one of the plurality of third party prices offered for sale on a same date on which the first online transaction occurred, wherein one or more price differences are based on determining a per-unit cost of each of one or more discounted identifiers of the first online transaction and a prorated price, and wherein the prorated price is determined based on a third-party offer to buy multiple items (N) for a unit price (P) to get one or more additional items (M) for free;
subsequent to the first online transaction, identifying, by the server system using the savings system, the one or more discounted identifiers of the one or more item identifiers, the one of the plurality of third party prices of the third party record corresponding to the one or more discounted identifiers being less than a price paid for the one or more discounted identifiers by the one or more price differences;
crediting, by the server system using a redemption system, an account associated with a user identifier with an amount corresponding to the one or more price differences, wherein the savings system is in data communication with the redemption system;
providing a code that enables the amount to be applied to a purchase price of a second transaction of the one or more online transactions subsequent to the first online transaction;
receiving a first request to apply the amount to the purchase price of the second transaction using the code;
receiving, by the server system, a validation request to validate the code;
validating the code in response to the validation request, wherein the server system is in data communication with the redemption system; and applying, by the server system, the amount toward the purchase price of the second transaction after the code is validated.

2. The method of claim 1, wherein identifying, by the server system using the savings system, for the each item identifier of the at least the portion of the one or more item identifiers, the third party record, the third party record corresponding to the each item identifier and having the one of the plurality of third party prices further comprises:
identifying, for the each item identifier, pricing data describing prices offered by a third party of the plurality of third parties for an item of the plurality of items corresponding to the each item identifier within a first time window; and
determining the one of the plurality of third party prices from the pricing data within the first time window.

3. The method of claim 2, further comprising, for the each item identifier of the at least the portion of the one or more item identifiers:
identifying one or more third party prices of the plurality of third party prices offered within a second time window, the second time window being prior to the first time window; and
prior to the first online transaction of the one or more online transactions, setting an offer price for the each item identifier according to the one or more third party prices offered within the second time window.

4. The method of claim 2, further comprising, for the each item identifier of the at least the portion of the one or more item identifiers:
identifying one or more third party prices of the plurality of third party prices offered within a second time window, the second time window being prior to the first time window; and
determining acquiring costs for the each item identifier;
determining a popularity for the each item identifier; and
prior to the first online transaction of the one or more online transactions, setting an offer price for the each item identifier according to all of the one or more third party prices offered within the second time window, the acquiring costs, and the popularity of the each item identifier.

5. The method of claim 4, wherein determining the popularity for the each item identifier comprises determining at least one of:
an amount of sales for the each item identifier; or
a number of referrals for the each item identifier.

6. The method of claim 2, further comprising, for the each item identifier of the at least the portion of the one or more item identifiers:
identifying one or more third party prices of the plurality of third party prices offered within a second time window, the second time window being prior to the first time window;
determining acquiring costs for the each item identifier;
determining a popularity for the each item identifier;
determining revenue from secondary items purchased in the one or more online transactions including the each item identifier; and
prior to the first online transaction of the one or more online transactions, setting an offer price for the each item identifier according to all of the one or more third party prices offered within the second time window, the acquiring costs, the popularity of the each item identifier, and the revenue from the secondary items.

7. The method of claim 1, wherein the second transaction of the one or more online transactions is conducted at a point of sale (POS) device.

8. A computer system comprising one or more processors and one or more memory devices operably coupled to the one or more memory devices, the one or more memory devices storing executable and operational code effective to cause the one or more processors to:
automatically obtain a first set of prices of a plurality of items offered for sale on third party web sites associated with at least a portion of a plurality of third parties using a computerized web crawler, wherein using the computerized web crawler to automatically obtain the first set of prices occurs at a first frequency to update the first set of prices;
obtain a second set of prices of the plurality of items based on prices advertised in at least one third party retail store associated with at least one of the plurality of third parties;
store the second set of prices in a database;
update the second set of prices at a second frequency different than the first frequency;
obtain a plurality of third party prices of the plurality of items by searching at least one of the first set of prices or the second set of prices;
receive a first record of one or more items of the plurality of items in a first online transaction with a first entity, the first record comprising one or more item identifiers associated with the one or more items, wherein the first online transaction of one or more online transactions is automatically submitted for review;
subsequent to the first online transaction, identify for each item identifier of at least a portion of the one or more item identifiers, a third party record, the third party record corresponding to the each item identifier and having one of the plurality of third party prices offered for sale on a same date on which the first online transaction occurred, wherein one or more price differences are based on determining a per-unit cost of each of one or more discounted identifiers of the first online transaction and a prorated price, and wherein the prorated price is determined based on a third-party offer to buy multiple items (N) for a unit price (P) to get one or more additional items (M) for free;
subsequent to the first online transaction, identify the one or more discounted identifiers of the one or more item identifiers, the one of the plurality of third party prices of the third party record corresponding to the one or more discounted identifiers being less than a price paid for the one or more discounted identifiers by the one or more price differences;
credit an account associated with a user identifier with an amount corresponding to the one or more price differences;
provide a code that enables the amount to be applied to a purchase price of a second transaction of the one or more online transactions subsequent to the first online transaction;
receive a first request to apply the amount to the purchase price of the second transaction using the code;
receive a validation request to validate the code;
validate the code in response to the validation request; and
apply the amount toward the purchase price of the second transaction subsequent to the first online transaction after the code is validated.

9. The computer system of claim 8, wherein the executable and operational code are further effective to cause the one or more processors to identify, for the each item identifier of the at least the portion of the one or more item identifiers, the third party record, the third party record corresponding to the each item identifier and having the one of the plurality of third party prices by:

identifying, for the each item identifier, pricing data describing prices offered by a third party of the plurality of third parties for an item of the plurality of items corresponding to the each item identifier within a first time window; and determining the one of the plurality of third party prices from the pricing data within the first time window.

10. The computer system of claim 9, wherein the executable and operational code are further effective to cause the one or more processors to, for the each item identifier of the at least the portion of the one or more item identifiers:

identify one or more third party prices of the plurality of third party prices offered within a second time window, the second time window being prior to the first time window; and prior to the first online transaction of the one or more online transactions, set an offer price for the each item identifier according to the one or more third party prices offered within the second time window.

11. The computer system of claim 9, wherein the executable and operational code are further effective to cause the one or more processors to, for the each item identifier of the at least the portion of the one or more item identifiers:

identify one or more third party prices of the plurality of third party prices offered within a second time window, the second time window being prior to the first time window;

determine acquiring costs for the each item identifier;

determine a popularity for the each item identifier; and prior to the first online transaction of the one or more online transactions, set an offer price for the each item identifier according to all of the one or more third party prices offered within the second time window, the acquiring costs, and the popularity of the each item identifier.

12. The computer system of claim 11, wherein the executable and operational code are further effective to cause the one or more processors to determine the popularity for the each item identifier by determining at least one of:

an amount of sales for the each item identifier; or a number of referrals for the each item identifier.

13. The computer system of claim 9, wherein the executable and operational code are further effective to cause the one or more processors to, for the each item identifier of the at least the portion of the one or more item identifiers:

identify one or more third party prices of the plurality of third party prices offered within a second time window, the second time window being prior to the first time window;

determine acquiring costs for the each item identifier;

determining a popularity for the each item identifier;

determine revenue from secondary items purchased in the one or more online transactions including the each item identifier; and prior to the first online transaction, set an offer price for the each item identifier according to all of the one or more third party prices offered within the second time window, the acquiring costs, the popularity of the each item identifier, and the revenue from the secondary items.

14. The computer system of claim 8, wherein the second transaction of the one or more online transactions is conducted at a point of sale (POS) device.

15. A method comprising:

using a computerized web crawler to automatically obtain a first set of prices of a plurality of items offered for sale on third party web sites associated with at least one of a plurality of third parties, wherein using the computerized web crawler to automatically obtain the first set of prices occurs at a first frequency to update the first set of prices;

obtaining, by a savings system, a second set of prices of the plurality of items based on prices advertised in at least one third party retail store;

storing, by the savings system, the second set of prices in a database;

updating the second set of prices at a second frequency different than the first frequency;

obtaining a plurality of third party prices of the plurality of items by searching at least one of the first set of prices or the second set of prices;

receiving, by a server system, a first record of one or more items of the plurality of items in a first transaction concluded on a first point of sale (POS) device, the first record including one or more item identifiers associated with the one or more items, and a price paid for each item identifier of the one or more item identifiers, wherein the first transaction of one or more transactions is automatically submitted for review;

subsequent to the first transaction, identifying, by the server system using the savings system, for the each item identifier of at least a portion of the one or more item identifiers, a third party record, the third party record corresponding to the each item identifier and having one of the plurality of third party prices offered for sale on a same date on which the first transaction occurred, wherein one or more price differences are based on determining a per-unit cost of each of one or more discounted identifiers of the first transaction and a prorated price, and wherein the prorated price is determined based on a third-party offer to buy multiple items (N) for a unit price (P) to get one or more additional items (M) for free;

subsequent to the first transaction, identifying, by the server system using the savings system, the one or more discounted identifiers of the one or more item identifiers, the one of the plurality of third party prices of the third party record corresponding to the one or more discounted identifiers being less than the price paid for the one or more discounted identifiers by the one or more price differences;

crediting, by the server system using a redemption system, an account associated with a user identifier with an amount corresponding to the one or more price differences, wherein the savings system is in data communication with the redemption system;

providing a code that enables the amount to be applied to a purchase price of a second transaction of one or more online transactions subsequent to the first transaction;

receiving a first request to apply the amount to the purchase price of the second transaction using the code;

receiving a validation request to validate the code from one of the first POS device or a second POS device;

validating the code in response to the validation request, wherein the one of the first POS device or the second POS device is in data communication with the redemption system;

applying, by the server system, the amount toward the purchase price of the second transaction of the one or more online transactions subsequent to the first transaction after the code is validated, the second transaction being an online transaction of the one or more online transactions;

determining, by the server system, based exclusively on applying the amount toward the purchase price of the second transaction, that the first transaction and the second transaction are both associated with a user;

characterizing, by the server system, interests of the user based on the first transaction and the second transaction; and generating, by the server system, at least one of a recommendation or a promotion for an additional item corresponding to the interests of the user as characterized.

16. The method of claim 15, wherein crediting the account associated with the user identifier with the amount corresponding to the one or more price differences comprises crediting the account with the amount and associating the account with the user.

17. The method of claim 16, further comprising:
associating the account with the code; and
issuing a gift card associated with the account.

18. The method of claim 15, further comprising identifying, for each item of the one or more items of the first transaction of the one or more online transactions, a third party price of the plurality of third party prices corresponding to the each item by:

identifying a geographic location of the first POS device at which the first transaction was concluded; and identifying as the third party price for the each item a price offered for the each item at a retail location within a threshold distance from the geographic location of the first POS device.

19. The method of claim 15, wherein receiving the first record of the one or more items of the plurality of items in the first transaction of the one or more transactions concluded on the first POS device is accomplished by:

receiving, from a user computer, a transaction identifier; and retrieving the first record of the first transaction using the transaction identifier.

20. The method of claim 15, further comprising:

conducting, by the server system, a third transaction of the one or more online transactions with the user prior to the first transaction of the one or more transactions and the second transaction of the one or more online transactions; and wherein characterizing the interests of the user further comprises characterizing the interests of the user based on the first transaction of the one or more transactions or the second and third transactions of the one or more online transactions.

* * * * *